(12) United States Patent
Youn et al.

(10) Patent No.: US 11,107,193 B2
(45) Date of Patent: Aug. 31, 2021

(54) METHOD AND APPARATUS FOR PROCESSING IMAGE

(71) Applicant: SAMSUNG ELECTRONICS CO., LTD., Swuon-si (KR)

(72) Inventors: Sung-wook Youn, Seoul (KR); Do-wan Kim, Suwon-si (KR); Jae-kyeong Lee, Yongin-si (KR); Yong-gyoo Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 20 days.

(21) Appl. No.: 16/476,485

(22) PCT Filed: Mar. 5, 2018

(86) PCT No.: PCT/KR2018/002566
§ 371 (c)(1),
(2) Date: Jul. 8, 2019

(87) PCT Pub. No.: WO2018/164425
PCT Pub. Date: Sep. 13, 2018

(65) Prior Publication Data
US 2020/0020080 A1 Jan. 16, 2020

(30) Foreign Application Priority Data
Mar. 6, 2017 (KR) .......................... 10-2017-0028544

(51) Int. Cl.
*G06T 3/60* (2006.01)
*G06T 7/11* (2017.01)
*G06T 5/00* (2006.01)

(52) U.S. Cl.
CPC ................ *G06T 3/60* (2013.01); *G06T 5/001* (2013.01); *G06T 7/11* (2017.01)

(58) Field of Classification Search
CPC . G06T 2207/20021; G06T 2207/20182; G06T 2207/30244; G06T 3/60;
(Continued)

(56) References Cited

U.S. PATENT DOCUMENTS 8,023,003 B2 9/2011 Paik et al.
9,438,800 B1 9/2016 Kozko
(Continued)

FOREIGN PATENT DOCUMENTS

CN 105681674 A 6/2016
JP 2015-8428 A 1/2015
(Continued)

OTHER PUBLICATIONS

Communication dated Nov. 6, 2019, issued by the European Patent Office in counterpart European Application No. 18763298.9.
(Continued)

*Primary Examiner* — Bobbak Safaipour
(74) *Attorney, Agent, or Firm* — Sughrue Mion, PLLC

(57) ABSTRACT

Provided is a method of processing an image, the method including: obtaining rotation information with respect to each of a plurality of regions included in a 360-degree image; determining representative rotation information indicating movement of a capturing device, the movement occurring when capturing the 360-degree image, based on the rotation information of each of the plurality of regions; and correcting distortion of the 360-degree image based on the determined representative rotation information.

13 Claims, 9 Drawing Sheets

(58) Field of Classification Search
CPC . G06T 5/001; G06T 7/11; G06T 7/246; G06T 5/00; H04N 5/232; Y10T 403/7123; Y10T 403/75; F16B 33/02; F16B 37/02; F16B 5/02

See application file for complete search history.

(56) References Cited

U.S. PATENT DOCUMENTS

| | | | |
|---|---|---|---|
| 10,319,086 B2 | 6/2019 | Lee et al. | |
| 10,453,246 B2* | 10/2019 | Choi | H04N 21/816 |
| 2010/0123660 A1* | 5/2010 | Park | G06F 3/0346 |
| | | | 345/157 |
| 2015/0029306 A1 | 1/2015 | Cho et al. | |
| 2017/0351325 A1* | 12/2017 | Hashimoto | A63F 13/213 |
| 2019/0020821 A1 | 1/2019 | Ryu et al. | |

FOREIGN PATENT DOCUMENTS

| | | |
|---|---|---|
| JP | 2015-158627 A | 9/2015 |
| KR | 10-0614004 B1 | 8/2006 |
| KR | 10-2009-0097613 A | 9/2009 |
| KR | 10-2015-0011938 A | 2/2015 |
| KR | 10-2015-0089677 A | 8/2015 |
| KR | 10-2016-0113887 A | 10/2016 |
| KR | 10-2017-0019827 A | 2/2017 |
| KR | 10-2019-0104758 A | 9/2019 |

OTHER PUBLICATIONS

Kai-yu Wang, "Experiment Research on Electronic Image Stabilization of Omni-directional Camera System", Industrial Engineering and Engineering Management (IE&EM) 2011 1IEEE 18th International Conference , IEEE, Sep. 3, 2011, pp. 1682-1685, XP032056329 (4 pages total).

Search Report and Written Opinion dated Jun. 25, 2018, issued by the International Searching Authority in International Application No. PCT/KR2018/002566 (PCT/ISA/210 and PCT/ISA/237).

Van Der Auwera, et al., "AHG8: Truncated Square Pyramid Projection (TSP) for 360 Video", Oct. 2016, Joint Video Exploration Team (JVET) of ITU-T SG 16 WP 3 and ISO/IEC JTC 1/SC 29/WG 11, 12 pages total.

Communication dated Jul. 3, 2020, issued by the Korean Intellectual Property Office in Korean Application No. 10-2017-0028544.

Communication dated Jul. 16, 2021, issued by the European Patent Office in European Patent Application No. 18 763 298.9.

* cited by examiner

<DISTRIBUTION OF ROTATION INFORMATION>

METHOD AND APPARATUS FOR PROCESSING IMAGE

TECHNICAL FIELD

The present disclosure relates to a method of processing an image and an apparatus for processing an image.

BACKGROUND ART

Various technologies have been developed to provide an environment in which a user may experience virtual reality. For example, when a 360-degree image captured in all directions of a subject is viewed by a device, such as a head mounted display (HMD), the user may experience virtual reality. However, in the case of the 360-degree image, camera shaking may occur in a process of capturing an image, due to a factor, such as a subject capturing the image or an external environment, which may be unintentionally recognized as a movement by the user experiencing the virtual reality, and thus, the sense of immersion in the virtual reality may be deteriorated or the inconvenience, such as dizziness, etc. may be caused.

In particular, in the case of the 360-degree image, distortion may be severe due to content characteristics, and since the image is captured by more than one camera, an inaccurate movement value may be estimated when a previous movement estimation technique for an image captured by a single camera is applied. Thus, it is required to develop a technique for correcting distortion of the 360-degree image.

DESCRIPTION OF EMBODIMENTS

Technical Problem

Provided are a method and apparatus for processing an image, according to which distortion, which may occur when capturing a 360-degree image, due to an external environment, such as shaking of a capturing device, etc., may be corrected.

Solution to Problem

According to an aspect of the present disclosure, a method of processing an image includes: obtaining rotation information with respect to each of a plurality of regions included in a 360-degree image; determining representative rotation information indicating movement of a capturing device, the movement occurring when capturing the 360-degree image, based on the rotation information of each of the plurality of regions; and correcting distortion of the 360-degree image based on the determined representative rotation information.

BEST MODE

Figure 1:
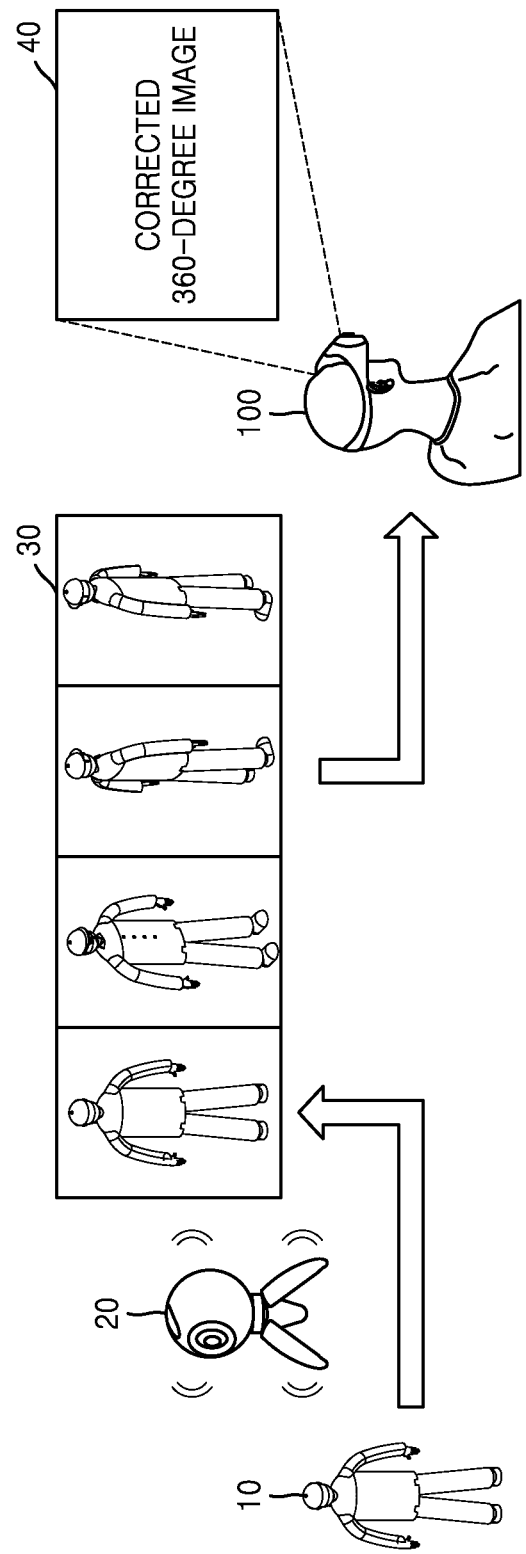
FIG. 1 is a conceptual view for describing a method of processing an image, according to an embodiment.

A method of processing an image includes: obtaining rotation information with respect to each of a plurality of regions included in a 360-degree image; determining representative rotation information indicating movement of a capturing device, the movement occurring when capturing the 360-degree image, based on the rotation information of each of the plurality of regions; and correcting distortion of the 360-degree image based on the determined representative rotation information.

The method may further include: mapping the 360-degree image to each surface of a predetermined polygon and obtaining the plurality of regions from an image mapped to each surface of the polygon.

The method may further include dividing the 360-degree image into the plurality of regions based on a predetermined number.

The determining of the representative rotation information may include determining the representative rotation information by calculating an average value or a median value of the rotation information of the plurality of regions.

The determining of the representative rotation information may include selecting the rotation information of at least one region based on distribution of the rotation information of each of the plurality of regions and determining the representative rotation information from the selected rotation information of the at least one region.

The selecting may include selecting a region from among the plurality of regions, the region having the rotation information having high concentration in distribution of the rotation information.

The determining of the representative rotation information may include determining the representative rotation information by combining the rotation information of each of the plurality of regions based on a predetermined weight.

The weight may be determined based on an object distribution rate included in the 360-degree image.

The determining of the representative rotation information may include identifying at least one object included in the 360-degree image, selecting one or more regions of the plurality of regions based on at least one of a characteristic and a distribution of the identified at least one object, and determining the representative rotation information from the rotation information of the selected one or more regions.

An apparatus for processing an image includes: an input portion configured to obtain a 360-degree image; and a processor configured to obtain rotation information with respect to each of a plurality of regions included in the 360-degree image, determine representative rotation information indicating movement of a capturing device, the movement occurring when capturing the 360-degree image, based on the rotation information of each of the plurality of regions, and correct distortion of the 360-degree image based on the determined representative rotation information.

MODE OF DISCLOSURE

The terms used in this specification will be briefly described and the disclosure will be described in detail.

The terms used in the disclosure are selected from among common terms that are currently widely used in consideration of their function in the disclosure. However, the terms may be different according to an intention of one of ordinary skill in the art, a precedent, or the advent of new technology. Also, in particular cases, the terms are discretionally selected by the applicant of the disclosure, and the meaning of those terms will be described in detail in the corresponding part of the detailed description. Therefore, the terms used in the disclosure are not merely designations of the terms, but the terms are defined based on the meaning of the terms and content throughout the disclosure.

Throughout the specification, when a part "includes" an element, it is to be understood that the part additionally includes other elements rather than excluding other elements as long as there is no particular opposing recitation. Also, the terms described in the specification, such as "unit," "module," etc., denote a unit processing at least one function or operation, which may be implemented as hardware or software or a combination thereof.

Hereinafter, embodiments of the disclosure will now be described more fully with reference to the accompanying drawings for one of ordinary skill in the art to be able to perform the disclosure without any difficulty. The disclosure may, however, be embodied in many different forms and should not be construed as being limited to the embodiments set forth herein. Also, parts in the drawings unrelated to the detailed description are omitted to ensure clarity of the disclosure. Like reference numerals in the drawings denote like elements.

FIG. 1 is a conceptual view for describing a method of processing an image, according to an embodiment.

Referring to FIG. 1, an apparatus (100, hereinafter, an image processing apparatus) for processing an image may obtain a 360-degree image. Here, the 360-degree image is an image in all 360-degree directions and may be generated from a plurality of images 30 obtained as a result of capturing an object 10 at various angles. The 360-degree image may include images of the object 10 in all directions of gazes in 360 degrees. Accordingly, a user may view an image of the object in a direction selected by the user or a direction of a gaze of the user, based on the 360-degree image.

Meanwhile, when a capturing device 20 captures the object 10, distortion may occur in an image due to movement of the capturing device 20. In particular, in the case of the 360-degree image, capturing is performed by a plurality of capturing devices, and thus, a probability that distortion of the image occurs due to the movement of the capturing device 20 may be increased.

The image processing apparatus 100 according to an embodiment may determine rotation information of a 360-degree image based on rotation information of each of a plurality of regions included in the 360-degree image, in order to correct distortion of the 360-degree image, which may be generated due to movement of the capturing device 20. Hereinafter, for convenience of explanation, the rotation information of the 360-degree image, the rotation information being calculated based on the plurality of regions included in the 360-degree image, will be described as representative rotation information.

For example, the image processing apparatus 100 may divide the 360-degree image into a plurality of regions. Also, the image processing apparatus 100 may obtain rotation information of each of the plurality of regions. As another example, the image processing apparatus 100 may map the 360-degree image to each of the surfaces of a polygon. Here, an image mapped to each surface may correspond to each of the plurality of regions described above. The image processing apparatus 100 may reduce the effect of distortion occurring around a pole of the 360-degree image, by mapping the 360-degree image to each surface of a polygon.

Meanwhile, the image processing apparatus 100 may correct the distortion of the 360-degree image based on determined representative rotation information. Also, the image processing apparatus 100 may output a corrected 360-degree image 40 on a display. The image processing apparatus 100 may sense a direction of a gaze of a user and output a region in the corrected 360-degree image 40, the region corresponding to the sensed direction of the gaze of the user. However, this is only an embodiment, and when the image processing apparatus 100 does not include a display or there is an external device including a display, the image processing apparatus 100 may transmit the corrected 360-degree image 40 to the external device.

Meanwhile, the image processing apparatus 100 according to an embodiment may be realized in various forms. For example, the image processing apparatus 100 described in this specification may include a smartphone, smart glasses, a head mounted display (HMD), etc. However, it is only an embodiment, and the image processing apparatus 100 is not limited thereto.

Figure 2:
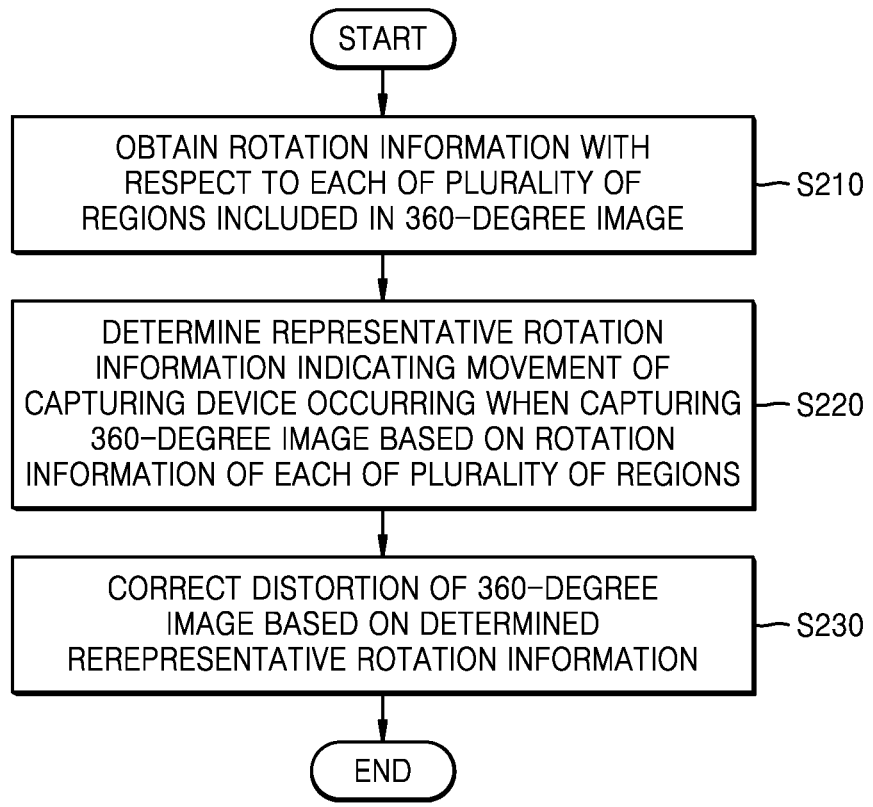
FIG. 2 is a flowchart of a method of processing an image, according to an embodiment.

FIG. 2 is a flowchart of a method of processing an image, according to an embodiment.

In operation S210, an image processing apparatus may obtain rotation information of each of a plurality of regions included in a 360-degree image.

The image processing apparatus may obtain the 360-degree image. For example, the image processing apparatus may receive the 360-degree image from a capturing device or an external device, such as a server, etc.

The image processing apparatus according to an embodiment may divide the 360-degree image into a plurality of regions of a predetermined number. For example, the image processing apparatus may divide the 360-degree image into six regions. However, it is only an embodiment, and the number of regions into which the 360-degree image is divided is not limited thereto. The image processing apparatus may increase the number of regions into which the 360-degree image is divided in order to increase the accuracy of correction, based on a result of correction of distortion of the 360-degree image.

Meanwhile, according to another embodiment, the image processing apparatus may map the 360-degree image to a polygon. When the 360-degree image has an equirectangular projection (ERP) form, the image processing apparatus may map the 360-degree image to the polygon in order to minimize an error of rotation information obtained from each of the regions. For example, the image processing apparatus may map the 360-degree image to each of the surfaces of a hexahedron. However, this is only an embodiment, and the polygon to which the 360-degree image is mapped is not limited to the example described above. The image processing apparatus may increase the number of surfaces of a polygon to which the 360-degree image is mapped, in order to increase the accuracy of correction, based on a result of correcting distortion of the 360-degree image.

Also, the image processing apparatus may extract at least one feature point from each of the plurality of regions. For example, the image processing apparatus may extract the feature point of each of the plurality of regions based on at least one of an edge, a corner, a blob, and a ridge determined based on a pixel value included in each of the plurality of regions. However, this is only an embodiment, and methods of extracting the feature point of each region are not limited thereto.

The image processing apparatus may detect a location of the extracted feature point with respect to a plurality of 360-degree images. The image processing apparatus may obtain the rotation information of each of the plurality of regions based on the detected result. Here, the rotation information may be indicated based on at least one of yaw, pitch, and roll angles.

In operation S220, the image processing apparatus may determine representative rotation information indicating shaking of the capturing device occurring when capturing the 360-degree image, based on the rotation information of each of the plurality of regions.

According to an embodiment, the image processing apparatus may determine the representative rotation information of the 360-degree image as an average value or a median value with respect to the rotation information of each of the plurality of regions. According to another embodiment, the image processing apparatus may determine the representative rotation information of the 360-degree image based on distribution of rotation information of each of the plurality of regions. For example, the image processing apparatus may determine the representative rotation information as an average value of regions having rotation information having a distribution equal to or greater than a critical value, or rotation information having the highest distribution.

Also, according to another embodiment, the image processing apparatus may determine the representative rotation information of the 360-degree image, by combining the rotation information of each of the plurality of regions based on a predetermined weight. The image processing apparatus may determine the weight based on a distribution rate of an object included in the 360-degree image. For example, the image processing apparatus may set a weight with respect to rotation information of a region having a high object distribution rate to be relatively less than a weight with respect to rotation information of a region having a low object distribution rate. As another example, the image processing apparatus may set a weight with respect to rotation information of a region having a high moving object distribution rate to be relatively less than a weight with respect to rotation information of a region having a low moving object distribution rate. However, they are only examples, and methods of determining the weight are not limited to the examples described above.

According to another embodiment, the image processing apparatus may determine the representative rotation information from the rotation information of the plurality of regions, based on at least one of a characteristic of at least one object included in the 360-degree image and a distribution of the at least one object included in the 360-degree image. This aspect will be described below in detail with reference to FIG. 8.

In operation S230, the image processing apparatus may correct distortion of the 360-degree image based on the determined representative rotation information.

According to an embodiment, the image processing apparatus may correct the distortion of the 360-degree image by performing a smoothing operation on the 360-degree image based on the determined representative rotation information. The image processing apparatus may determine the representative rotation information by using the plurality of pieces of rotation information of the plurality of regions included in the 360-degree image, thereby increasing the accuracy of prediction of movement of the capturing device, the movement occurring when capturing the 360-degree image.

Figure 3:
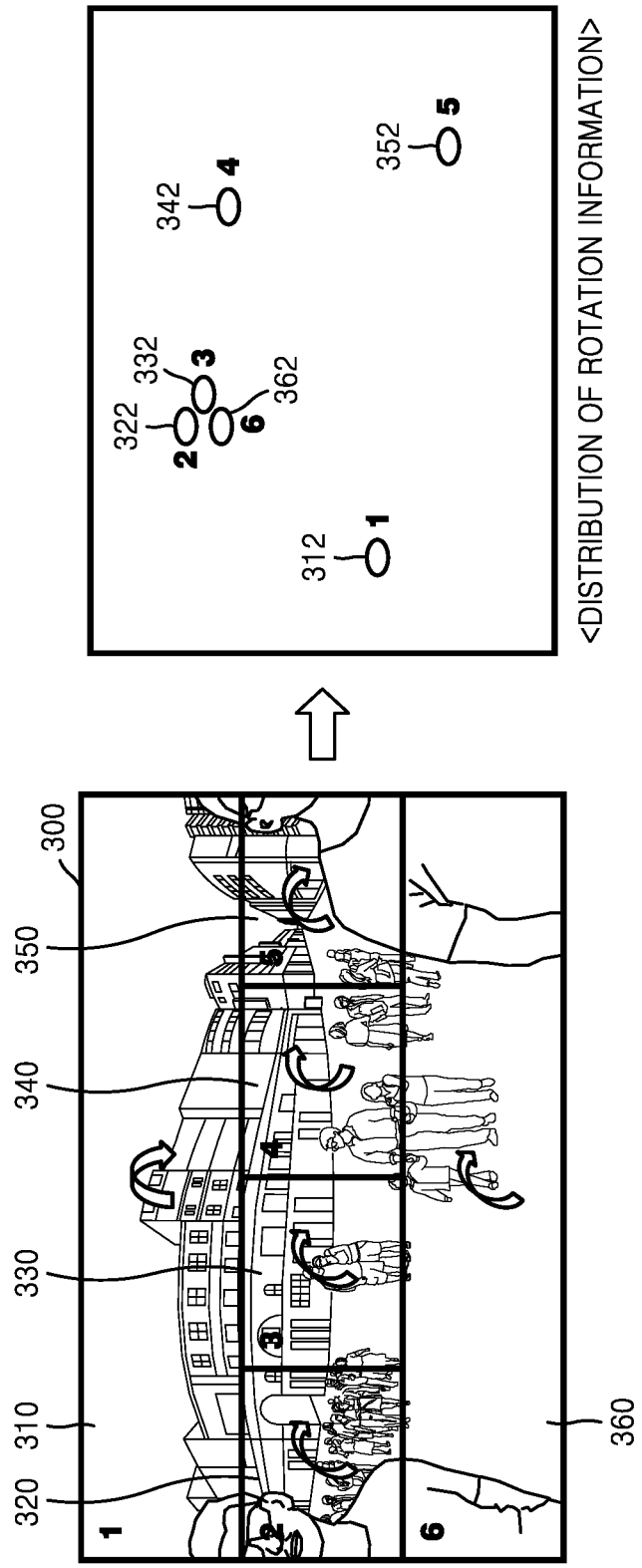
FIG. 3 is a view for describing a method of determining, performed by an image processing apparatus, representative rotation information, based on rotation information of a plurality of regions, according to an embodiment.

FIG. 3 is a view for describing a method of determining, performed by an image processing apparatus, representative rotation information, based on rotation information of a plurality of regions, according to an embodiment.

Referring to FIG. 3, the image processing apparatus may obtain a plurality of regions 310, 320, 330, 340, 350, and 360 from a 360-degree image 300. For example, the image processing apparatus may obtain the plurality of regions 310, 320, 330, 340, 350, and 360 by dividing the 360-degree image 300 or mapping the 360-degree image 300 to each of the surfaces of a hexahedron.

Also, the image processing apparatus may obtain rotation information of each of the plurality of regions 310, 320, 330, 340, 350, and 360. Here, the rotation information may be generated based on a result of detecting a feature point extracted from each of the plurality of regions 310, 320, 330, 340, 350, and 360, with respect to a plurality of 360-degree images.

Meanwhile, the image processing apparatus may cluster the rotation information of the plurality of regions 310, 320, 330, 340, 350, and 360 in order to calculate representative rotation information from the rotation information of the plurality of regions 310, 320, 330, 340, 350, and 360. According to an embodiment, the image processing apparatus may identify distribution of the rotation information, before clustering the rotation information of the plurality of regions 310, 320, 330, 340, 350, and 360.

Referring to FIG. 3, the distribution of first rotation information 312, second rotation information 322, third rotation information 332, fourth rotation information 342, fifth rotation information 352, and sixth rotation information 362 obtained from the first region 310, the second region 320, the third region 330, the fourth region 340, the fifth region 350, and the sixth region 360 may be identified.

According to an embodiment, the image processing apparatus may cluster the second rotation information 322, the third rotation information 332, and the sixth rotation information 362 into the same group, based on the distribution of the rotation information.

Meanwhile, the image processing apparatus may determine the representative rotation information by selecting at least one of the plurality of regions 310, 320, 330, 340, 350, and 360 based on the distribution of the rotation information or may determine the weight based on which the rotation information of the plurality of regions 310, 320, 330, 340, 350, and 360 is combined, based on the distribution of the rotation information. This aspect will be described in detail below with reference to FIG. 5.

Figure 4:
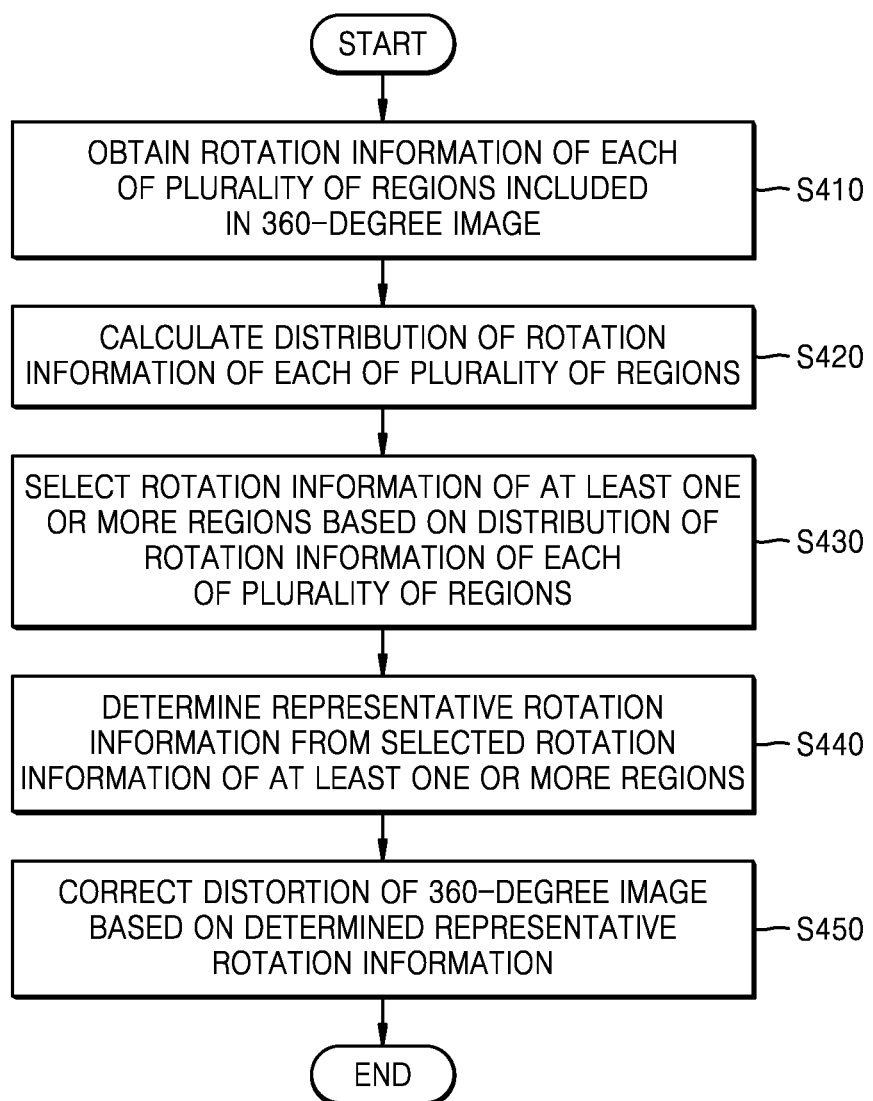
FIG. 4 is a flowchart of a method of determining, performed by an image processing apparatus, representative rotation information based on distribution of rotation information of a plurality of regions, according to an embodiment.

FIG. 4 is a flowchart of a method of determining, performed by an image processing apparatus, representative rotation information based on distribution of rotation information of a plurality of regions included in a 360-degree image, according to an embodiment.

In operation S410, the image processing apparatus may obtain the rotation information with respect to each of the plurality of regions included in the 360-degree image.

Meanwhile, operation S410 may correspond to operation S210 described above with reference to FIG. 2.

In operation S420, the image processing apparatus may calculate the distribution of the rotation information of each of the plurality of regions.

According to an embodiment, the rotation information of each of the plurality of regions obtained by the image processing apparatus may be indicated based on at least one of yaw, pitch, and roll angles. The image processing apparatus may calculate the distribution of the rotation information based on a value of each of the pieces of rotation information. The image processing apparatus may obtain information about a value of the rotation information having the highest rate or a region from which the rotation information having the highest rate is obtained, based on the calculated distribution.

In operation S430, the image processing apparatus may select the rotation information of at least one or more regions based on the distribution of the rotation information of each of the plurality of regions.

According to an embodiment, the image processing apparatus may select the at least one or more regions having the rotation information having a high concentration in the distribution of the rotation information of each of the plurality of regions. For example, when a specific rotation value is concentrated, the image processing apparatus may select the region having the specific rotation value or the region having a rotation value within a critical range based on the specific rotation value. However, it is only an embodiment, and methods of selecting, performed by the image processing apparatus, at least one or more regions based on the distribution of the rotation information are not limited to the examples described above.

In operation S440, the image processing apparatus may determine the representative rotation information from the rotation information of the selected at least one or more regions.

According to an embodiment, the image processing apparatus may determine the representative rotation information as an average value or a median value of the rotation information of the selected at least one or more regions. Also, according to another embodiment, when the region having the highest concentration in the distribution is selected, the image processing apparatus may determine the representative rotation information as the rotation information of the selected region. According to another embodiment, the image processing apparatus may determine the representative rotation information as the rotation information having the closest value to the average value of the rotation information of the selected at least one or more regions.

In operation S450, the image processing apparatus may correct distortion of the 360-degree image based on the determined representative rotation information.

Meanwhile, operation S450 may correspond to operation S230 described above with reference to FIG. 2.

Figure 5:
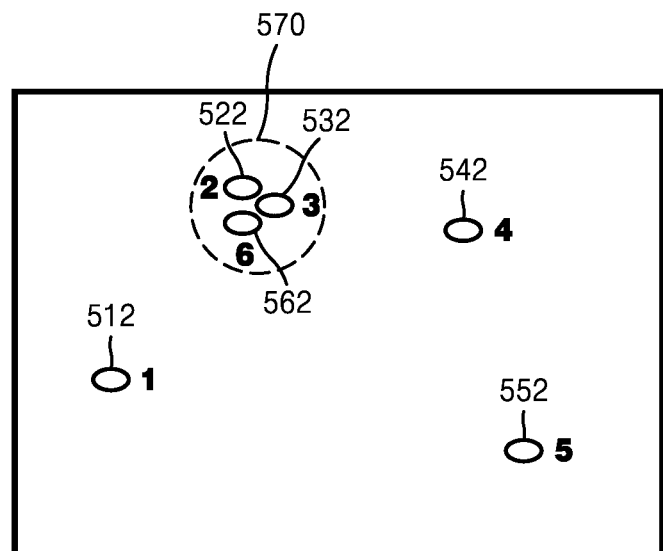
FIG. 5 is a view for describing a method of determining, performed by an image processing apparatus, representative rotation information based on distribution of rotation information of a plurality of regions, according to an embodiment.

FIG. 5 is a view for describing a method of determining, performed by an image processing apparatus, representative rotation information based on distribution of rotation information of a plurality of regions included in a 360-degree image, according to an embodiment.

Referring to FIG. 5, the image processing apparatus may calculate the distribution of the rotation information of each of the plurality of regions. Meanwhile, the distribution according to the present embodiment may be assumed to be the same as the distribution of FIG. 3.

According to an embodiment, the image processing apparatus may select rotation information having a high concentration, based on the calculated distribution. For example, the image processing apparatus may select second rotation information 522, third rotation information 532, and sixth rotation information 530 having similar values. The image processing apparatus may determine the representative rotation information as an average value or a median value of the selected rotation information 570. However, this is only an embodiment, and the image processing apparatus may determine the representative rotation information as rotation information having the closest value to the average value of the selected rotation information 570.

Meanwhile, based on a result of clustering, performed by the image processing apparatus, the rotation information of each of the plurality of regions based on the distribution, a plurality of clusters having a similar concentration may be determined.

According to an embodiment, when there are a plurality of clusters having a similar concentration, the image processing apparatus may select any one of the plurality of clusters based on a moving object rate included in the regions corresponding to each of the plurality of clusters. For example, the image processing apparatus may select the cluster having a low moving object rate from among the plurality of clusters. The image processing apparatus may determine the representative rotation information based on the rotation information included in the selected cluster.

According to another embodiment, when there are a plurality of clusters having a similar concentration, the image processing apparatus may determine a weight with respect to each of the plurality of clusters, based on the moving object rate included in the regions corresponding to each of the plurality of clusters. For example, the image processing apparatus may set the weight with respect to the cluster having a low moving object rate to be relatively high. The image processing apparatus may combine the rotation information of each of the plurality of clusters based on the determined weight.

Figure 6:
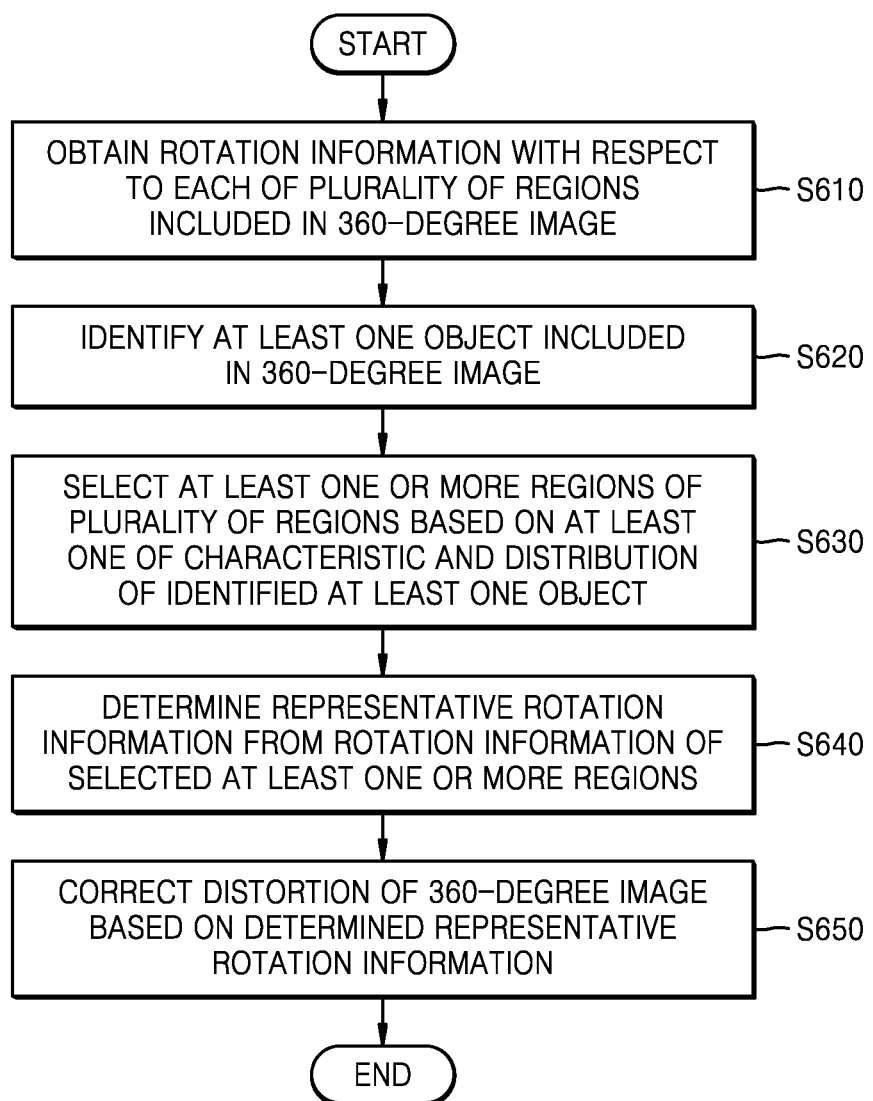
FIG. 6 is a flowchart of a method of determining, performed by an image processing apparatus, representative rotation information based on a result of identifying an object included in a 360-degree image and rotation information of a plurality of regions, according to an embodiment.

According to another embodiment, when there are a plurality of clusters having a similar concentration, the image processing apparatus may calculate the distribution of each of the plurality of clusters and may select the cluster having a relatively high clustered degree. However, these are only embodiments, and the image processing apparatus may determine the weight of each of the plurality of clusters based on a clustered degree. FIG. 6 is a flowchart of a method of determining, performed by an image processing apparatus, representative rotation information based on a result of identifying an object included in a 360-degree image and rotation information of a plurality of regions, according to an embodiment.

In operation S610, the image processing apparatus may obtain the rotation information with respect to each of the plurality of regions included in the 360-degree image.

Meanwhile, operation S610 may correspond to operation S210 described above with reference to FIG. 2.

In operation S620, the image processing apparatus may identify at least one object included in the 360-degree image. Here, the object may be an object included in the 360-degree image, such as a human being, a vehicle, a plant, an animal, a building, etc. Also, according to a setting, the image processing apparatus may also identify a background, such as a river, a mountain, a sky, or the like, as the object.

Meanwhile, according to an embodiment, the image processing apparatus may identify a location of the object, the number of objects, etc. According to another embodiment, the image processing apparatus may identify not only the location of the object and the number of objects, but also a type of the object. For example, the image processing apparatus may identify whether the object is a fixed object, such as a building, a statue, etc., or a moving object, such as an animal, a human being, etc.

In operation S630, the image processing apparatus may select one or more of a plurality of regions based on at least one of a characteristic and a distribution of the identified at least one object. Here, the characteristic of the object may include a type of the object, whether the object is moving or not, etc.

According to an embodiment, the image processing apparatus may select a region in which a concentration of the object is relatively low. According to another embodiment, the image processing apparatus may select a region in which a fixed object from among a plurality of objects included in the 360-degree image is located. However, these are only embodiments, and methods of selecting, performed by the image processing apparatus, the at least one or more regions based on at least one of the characteristic and the distribution of the identified at least one object are not limited thereto.

In operation S640, the image processing apparatus may determine the representative rotation information from the rotation information of the selected at least one or more regions.

According to an embodiment, when a plurality of regions are selected, the image processing apparatus may determine the representative rotation information as an average value or a median value of the rotation information of the selected plurality of regions. According to another embodiment, the image processing apparatus may determine the representative rotation information as the rotation information having the closest value to the average value of the rotation information of the selected at least one or more regions. According to another embodiment, when one region is selected, the image processing apparatus may determine the representative rotation information as the rotation information of the selected region.

In operation S650, the image processing apparatus may correct distortion of the 360-degree image based on the determined representative rotation information.

Meanwhile, operation S650 may correspond to operation S230 described above with reference to FIG. 2.

Figure 7:
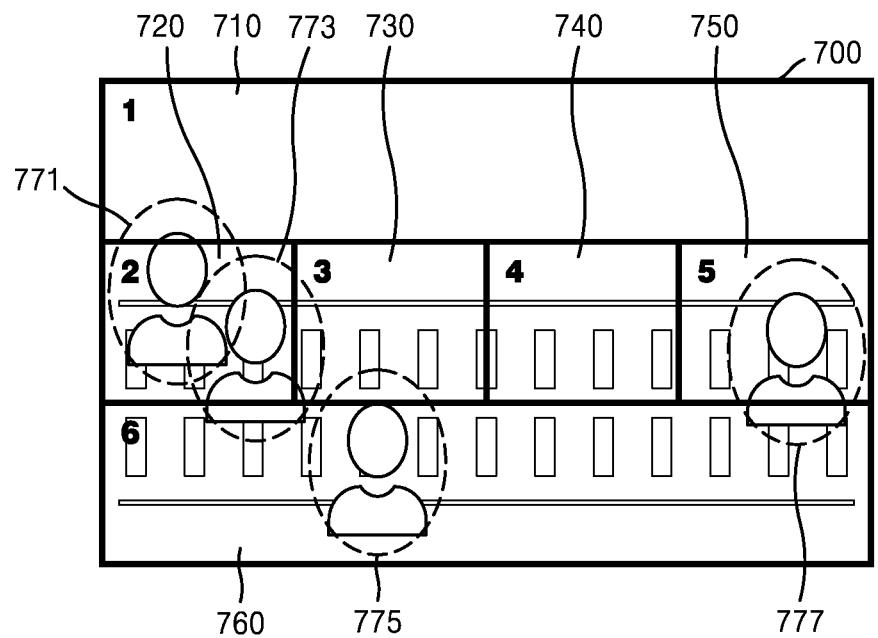
FIG. 7 is a view for describing a method of determining, performed by an image processing apparatus, representative rotation information based on distribution of an object included in a 360-degree image and rotation information of a plurality of regions, according to an embodiment.

FIG. 7 is a view for describing a method of determining, performed by an image processing apparatus, representative rotation information based on distribution of an object included in a 360-degree image and rotation information of a plurality of regions, according to an embodiment.

Referring to FIG. 7, the image processing apparatus may obtain a plurality of regions 710, 720, 730, 740, 750, and 760 from a 360-degree image 700. For example, the image processing apparatus may obtain the plurality of regions 710, 720, 730, 740, 750, and 760 by dividing the 360-degree image 700 or mapping the 360-degree image 700 to each of the surfaces of a hexahedron.

Also, the image processing apparatus may obtain the rotation information of each of the plurality of regions 710, 720, 730, 740, 750, and 760. Here, methods of obtaining the rotation information may correspond to the methods described above with reference to FIGS. 2 and 3.

Meanwhile, according to an embodiment, the image processing apparatus may identify a plurality of objects 771, 773, 775, and 777 included in the 360-degree image 700. Also, the image processing apparatus may identify a location of each of the plurality of objects 771, 773, 775, and 777 by identifying points at which the plurality of objects 771, 773, 775, and 777 are located in the 360-degree image.

The image processing apparatus may select one or more of the plurality of regions 710, 720, 730, 740, 750, and 760 based on the locations of the plurality of objects 771, 773, 775, and 777 included in the 360-degree image 700. For example, the image processing apparatus may select the third region 730 and the fourth region 740 having a small number of included objects, from among the plurality of regions 710, 720, 730, 740, 750, and 760. Meanwhile, the image processing apparatus may exclude a region, such as the first region 710, which does not include an object so that it is difficult to detect a feature point to obtain the rotation information. Also, the image processing apparatus may also exclude a region in which an object is concentrated, such as the second region 720, the fifth region 750, and the sixth region 760. When the object is concentrated, the rotation information of the corresponding region may be unclear due to movement of the object, and thus, the image processing apparatus may exclude the region in which the object is concentrated.

Meanwhile, the image processing apparatus may determine the representative rotation information as an average value or a median value of the rotation information of the selected third region 730 and fourth region 740. Also, according to another embodiment, the image processing apparatus may determine the representative rotation information as the rotation information having the closest value to the average value of the rotation information of the selected third region 730 and fourth region 740.

Figure 8:
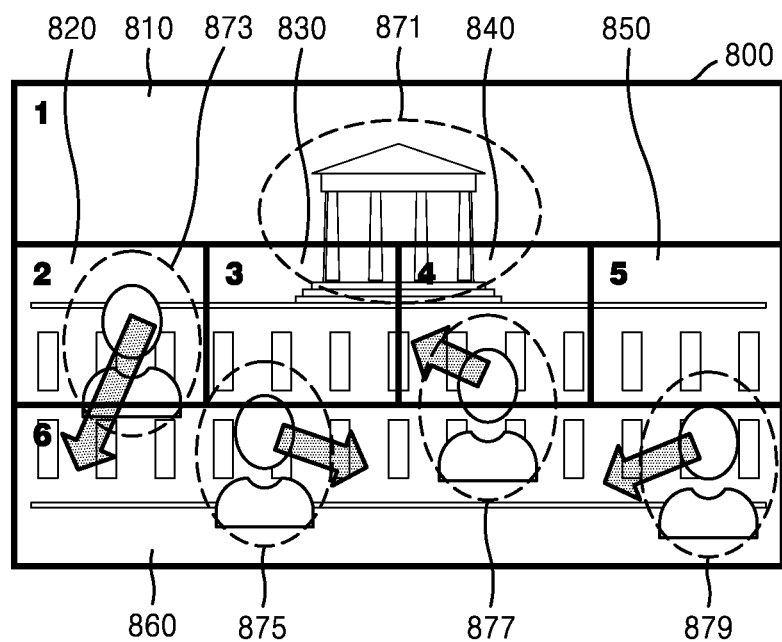
FIG. 8 is a view for describing a method of determining, performed by an image processing apparatus, representative rotation information based on a characteristic of an object included in a 360-degree image and rotation information of a plurality of regions, according to an embodiment.

FIG. 8 is a view for describing a method of determining, performed by an image processing apparatus, representative rotation information based on identification information of an object included in a 360-degree image and rotation information of a plurality of regions, according to an embodiment.

Referring to FIG. 8, the image processing apparatus may obtain a plurality of regions 810, 820, 830, 840, 850, and 860 from a 360-degree image 800. For example, the image processing apparatus may obtain the plurality of regions 810, 820, 830, 840, 850, and 860 by dividing the 360-degree image 800 or mapping the 360-degree image 800 to each of the surfaces of a hexahedron.

Also, the image processing apparatus may obtain the rotation information of each of the plurality of regions 810, 820, 830, 840, 850, and 860. Here, methods of obtaining the rotation information may correspond to the methods described above with reference to FIGS. 2 and 3.

Meanwhile, according to an embodiment, the image processing apparatus may identify a plurality of objects 871, 873, 875, 877, and 879 included in the 360-degree image 800. For example, the image processing apparatus may identify locations of the plurality of objects 871, 873, 875, 877, and 879 in the 360-degree image and characteristics of the plurality of objects 871, 873, 875, 877, and 879. Here, the characteristic of the object may include a type of the object, whether the object is moving or not, etc.

The image processing apparatus may classify the plurality of objects 871, 873, 875, 877, and 879 included in the 360-degree image 800 into a moving object and a fixed object. For example, the image processing apparatus may classify the plurality of objects 871, 873, 875, 877, and 879, into the first object 871, which is a building corresponding to the fixed object, and the second object 873, the third object 875, the fourth object 877, and the fifth object 879, which are human beings corresponding to the moving object.

According to an embodiment, the image processing apparatus may select the first region 810, in which a moving object is not located, from among the plurality of regions 810, 820, 830, 840, 850, and 860. The image processing apparatus may determine the representative rotation information of the 360-degree image 800 as the rotation information of the first region 810.

However, this is only an embodiment, and the image processing apparatus may select other regions, except regions in which shading occurs due to overlapping of objects, from among the plurality of regions 810, 820, 830, 840, 850, and 860.

Meanwhile, the image processing apparatus may determine the representative rotation information as an average value or a median value of the rotation information of selected regions. According to another embodiment, the image processing apparatus may determine the representative rotation information as the rotation information having the closest value to the average value of the rotation information of the selected regions.

Figure 9:
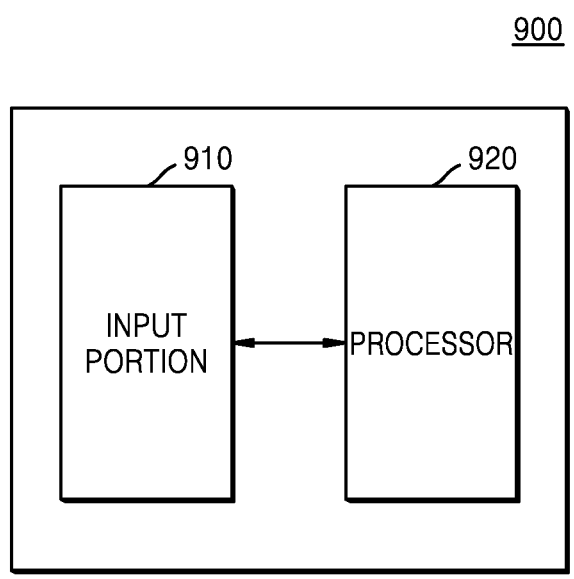
FIGS. 9 and 10 are block diagrams of an apparatus for processing an image, according to an embodiment.
Figure 10:
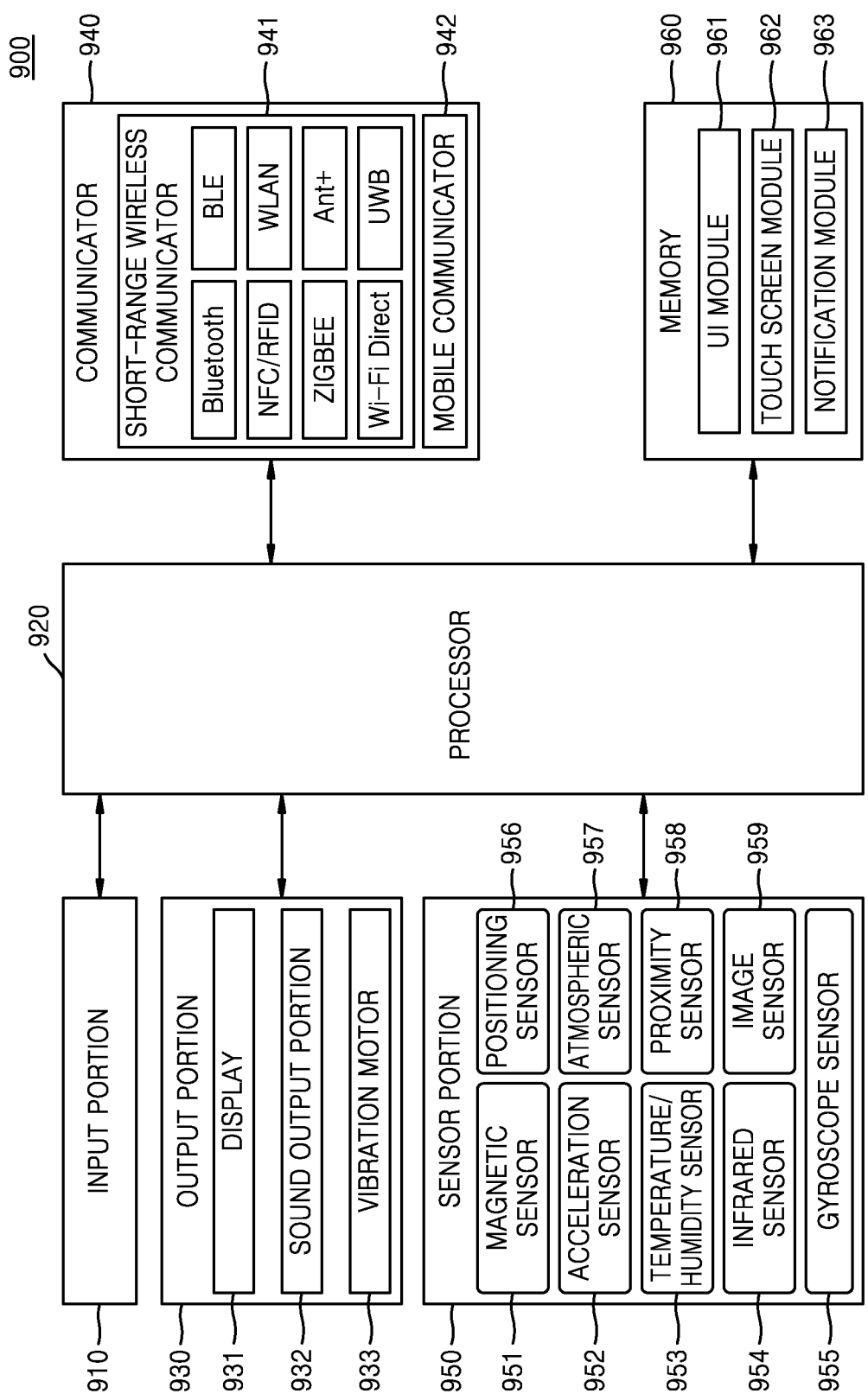

FIGS. 9 and 10 are block diagrams of an apparatus 900 for processing an image, according to an embodiment.

As illustrated in FIG. 9, the apparatus 900 for processing the image, according to an embodiment, may include an input portion 910 and a processor 920. However, not all illustrated components are essential components. The apparatus 900 for processing the image may be realized by including more or less components than the illustrated components.

For example, as illustrated in FIG. 10, the apparatus 900 for processing the image, according to an embodiment, may further include an output portion 930, a communicator 940, a sensor portion 950, and a memory 960, in addition to the input portion 910, and the processor 920.

Hereinafter, the components described above will be sequentially described.

The input portion 910 may obtain a 360-degree image. For example, the input portion 910 may obtain the 360-degree image from an external device. Meanwhile, when the apparatus 900 for processing the image and the external device are connected via a wireless network, the 360-degree image may be obtained by using the communicator 940 to be described below.

In general, the processor 920 may control general operations of the apparatus 900 for processing the image. For example, the processor 920 may generally control the input portion 910, the output portion 930, the communicator 940, the sensor portion 950, the memory 960, etc., by executing programs stored in the memory 960.

The processor 920 may obtain rotation information of each of a plurality of regions included in the 360-degree image. For example, the processor 920 may extract at least one feature point from each of the plurality of regions included in the 360-degree image. The processor 920 may detect a location of the extracted feature point with respect to a plurality of 360-degree images. The processor 920 may obtain the rotation information of each of the plurality of regions based on a detected result.

The processor 920 may determine representative rotation information indicating movement of a capturing device occurring when capturing the 360-degree image, based on the rotation information of each of the plurality of regions. Also, the processor 920 may correct distortion of the 360-degree image based on the determined representative rotation information.

The processor 920 according to an embodiment may map the 360-degree image to each of the surfaces of a predetermined polygon. Also, the processor 920 may obtain the plurality of regions from the image mapped to each of the surfaces of the polygon. Meanwhile, the processor 920 according to another embodiment may divide the 360-degree image into a plurality of regions according to a predetermined number.

The processor 920 may determine the representative rotation information by calculating an average value or a median value of the rotation information of each of the plurality of regions.

Also, as another example, the processor 920 may determine the representative rotation information based on distribution of the rotation information of each of the plurality of regions. The processor 920 may select the rotation information of at least one or more regions from among the plurality of regions, based on the distribution of the rotation information of each of the plurality of regions. For example, the processor 920 may select a region having the rotation information having a high concentration in the distribution of the rotation information, from among the plurality of regions. The processor 920 may determine the representative rotation information from the rotation information of the selected at least one or more regions.

The processor 920 may determine the representative rotation information by combining the rotation information of each of the plurality of regions based on a predetermined weight.

Also, the processor 920 may identify at least one object included in the 360-degree image and select at least one or more of the plurality of regions, based on at least one of a characteristic and a distribution of the identified at least one object. The processor 920 may determine the representative rotation information from the rotation information of the selected at least one or more regions.

The output portion 930 may be configured to output an audio signal, a video signal (for example, a 360-degree image), or a vibration signal, and the output portion 930 may include a display 931, a sound output portion 932, a vibration motor 933, etc.

The display 931 may display and output information processed by the apparatus 900 for processing the image. For example, the display 931 may display the 360-degree image for which distortion is corrected by the processor 920.

Meanwhile, when the display 931 and a touch pad are layered to form a touch screen, the display 931 may also be used as an input device, in addition to an output device. The display 931 may include at least one of a liquid crystal display, a thin film transistor-liquid crystal display, an organic light-emitting diode display, a flexible display, a three-dimensional (3D) display, and an electrophoretic display.

The sound output portion 932 may output audio data received from the communicator 150 or stored in the memory 170. Also, the sound output portion 122 may output a sound signal (for example, a call signal reception sound, a message reception sound, and a notification sound) associated with functions performed by the device 100. The sound output portion 122 may include a speaker, a buzzer, etc.

The vibration motor 933 may output a vibration signal. For example, the vibration motor 933 may output a vibration signal corresponding to the output of audio data or video data (for example, a 360-degree image, etc.). Also, the vibration motor 933 may output a vibration signal when a touch is input to the touch screen.

The communicator 940 may include one or more components configured to enable communication between the device 100 and an external device or between the device 100 and a server. For example, the communicator 940 may include a short-range wireless communicator 941 and a mobile communicator 942.

The short-range wireless communicator 941 may include a Bluetooth communicator, a Bluetooth low energy communicator, a near-field communicator, a WLAN (Wi-Fi) communicator, a Zigbee communicator, an infrared data association (IrDA) communicator, a Wi-fi direct (WFD) communicator, an ultrawide band (UWB) communicator, an Ant+ communicator, etc., but is not limited thereto.

The mobile communicator 942 may transceive wireless signals with at least one of a base station, an external terminal, and a server, via a mobile communication network. Here, the wireless signal may include a voice call signal, a video-telephony call signal, or various forms of data based on the exchange of text/multimedia messages.

The sensor portion 950 may sense a state of the apparatus 900 for processing the image or a state around the apparatus 900 for processing the image, and may transmit the sensed information to the processor 920.

The sensor portion 950 may include at least one of a magnetic sensor 951, an acceleration sensor 952, a temperature/humidity sensor 953, an infrared sensor 954, a gyroscope sensor 955, a positioning sensor (for example, a global positioning system (GPS)) 956, an atmospheric sensor 957, a proximity sensor 958, and an RGB sensor (an illuminance sensor) 959, but is not limited thereto. A function of each sensor may be intuitively inferred by one of ordinary skill in the art based on its name, and thus, its detailed description will not be given.

The memory 960 may store programs for processing and controlling the processor 920 and store input/output data (for example, rotation information of a plurality of regions, representative rotation information, and a 360-degree image).

The memory 960 may include at least one of various types of storage media, such as a flash memory type, a hard-disk type, a multi-media card micro-type, a card-type memory (for example, an SD or XD memory, etc.), random access memory (RAM), static random access memory (SRAM), read-only memory (ROM), electrically-erasable programmable read-only memory (EEPROM), programmable read-only memory (PROM), a magnetic memory, a magnetic disk, and an optical disk. Also, the apparatus 900 for processing the image may operate a web storage or a cloud server performing a storage function of the memory 960 on the Internet.

The programs stored in the memory 960 may be divided into a plurality of modules according to their functions. For example, the programs may be divided into a UI module 961, a touch screen module 962, a notification module 963, etc.

The UI module 961 may provide a user interface (UI), a graphics user interface (GUI), etc., which are specialized for correcting or outputting the 360-degree image. The touch screen module 962 may sense a touch gesture of a user on the touch screen and transmit information about the touch gesture to the processor 920. The touch screen module 962 according to an embodiment may recognize and analyze touch code. The touch screen module 962 may be formed as additional hardware including a controller.

Various sensors may be provided in the touch screen or around the touch screen to sense a touch or a proximity touch on the touch screen. The sensors for sensing the touch on the touch screen may include, for example, a tactile sensor. The tactile sensor refers to a sensor configured to sense a touch of a specific object as a human being senses or better than a human being. The tactile sensor may sense various information, such as the roughness of a contact surface, the rigidity of a contact object, and the temperature of a contact point.

Also, the sensors for sensing the touch on the touch screen may include, for example, a proximity sensor.

The proximity sensor refers to a sensor configured to detect the presence or absence of an object approaching a predetermined detection surface or a nearby object without mechanical contact by using the force of an electromagnetic field or infrared rays. Examples of the proximity sensor include a transmission-type photoelectric sensor, a direct reflection-type photoelectric sensor, a mirror reflection-type photoelectric sensor, a high frequency oscillation-type proximity sensor, a capacitive proximity sensor, a magnetic proximity sensor, an infrared proximity sensor, etc. The user's touch gestures may include tap, touch & hold, double tap, drag, panning, flick, drag and drop, swipe, and the like.

The notification module 963 may generate a signal for notifying the occurrence of an event of the apparatus 900 processing the image. Examples of the events include the notification of 360-degree image reception, the notification of 360-degree image outputting, etc. The notification module 963 may output the notification signal as a video signal through the display 931, may output the notification signal as an audio signal through the sound output portion 932, or may output the notification signal as a vibration signal through the vibration motor 933.

The method according to an embodiment may be implemented in the form of a program command that may be executed through various computer means, and may be recorded in a computer-readable recording medium. The computer-readable recording medium may include program commands, data files, data structures, and the like, alone or in combination. The program commands recorded on the computer-readable recording medium may be those specially designed and configured for the disclosure or may be available to one of ordinary skill in the art of computer software. Examples of the computer-readable recording medium may include magnetic media such as hard disks, floppy disks, and magnetic tapes, optical media such as CD-ROMs and DVDs, magneto-optical media such as floptical disks, and hardware devices specifically configured to store and execute program commands, such as ROM, RAM, flash memory, and the like. Examples of the program command include machine language code such as one produced by a compiler, as well as high-level language code that may be executed by a computer using an interpreter or the like.

Although reference numerals are described in the embodiments illustrated in the drawings and specific terms are used to describe the embodiments, the disclosure is not limited by the particular terms, and the embodiments may include all of the components which may be deemed as ordinary by one of ordinary skill in the art.

The embodiments may be indicated as functional block components and various processing operations. The functional blocks may be implemented as various numbers of hardware and/or software components performing specific functions. For example, the embodiments may implement direct circuit components, such as a memory, a processing circuit, a logic circuit, a look-up table, etc., which may perform various functions under control of one or more microprocessors or other control devices. Also, the embodiments may implement homogeneous or heterogeneous cores or different types of central processing units (CPUs). The components of the disclosure may be implemented by software programming or software components. Similarly to this, the embodiments may include various algorithms implemented by a combination of data structures, processes, routines, or other programming components and may be implemented by programming or scripting languages, such as C, C++, Java, assembler, and the like. Functions aspects may be implemented by an algorithm executed by one or more processors. Also, the embodiments may implement the related art for electronic environment settings, signal processing, and/or data processing. The terms, such as "mechanism," "element," "unit," etc., may be broadly used and are not limited to mechanical and physical components. The terms may denote a series of software routines in connection with a processor, etc.

Specific executions are described in the embodiments as examples, and the range of the embodiments is not limited by particular methods. For brevity of the specification, other functional aspects of electronic components, control systems, software, and the systems according to the related art may not be described. Also, the connections or connecting members of the lines between the components shown in the figures are illustrative of functional connections and/or physical or circuit connections, which may be replaced in an actual device or additionally provided by a variety of functional connections, physical connections, or circuit connections. Also, unless a component is specifically stated by using expressions, such as "essential," "important," etc., it may not be a necessary component for application of the disclosure.

The use of the term "the" or similar infinitive markers in the specification (in particular, the claims) according to the embodiments may correspond to both singular and plural components. In addition, when a range is described in the embodiments, the embodiments include separate values included in the range (unless there is a description contrary thereto), and it corresponds to the detailed description where each separate value included in the range is described. Finally, operations included in the methods according to the embodiments may be performed in appropriate orders, unless the orders are explicitly described, or there is a description contrary thereto. The embodiments are not necessarily limited to the described orders of the operations. The use of all examples or example terms (e.g., etc.) in the embodiments is for the purpose of describing the embodiments in detail and is not intended to limit the scope of the embodiments, when the scope of the embodiments is not limited by the claims. It will also be appreciated by one of ordinary skill in the art that various modifications, combinations, and alterations may be made within the scope of the appended claims or equivalents thereof, depending on design criteria and factors.

The invention claimed is:

1. A method of processing an image, the method comprising:
   obtaining rotation information with respect to each of a plurality of regions included in a 360-degree image;
   identifying at least one object included in the 360-degree image;
   selecting one or more regions of the plurality of regions based on at least one of a characteristic and a distribution of the identified at least one object;
   determining representative rotation information indicating movement of a capturing device, the movement occurring when capturing the 360-degree image, based on rotation information of the selected one or more regions; and
   correcting distortion of the 360-degree image based on the determined representative rotation information.

2. The method of claim 1, further comprising:
   mapping the 360-degree image to each surface of a predetermined polygon; and
   obtaining the plurality of regions from an image mapped to each surface of the polygon.

3. The method of claim 1, further comprising
   dividing the 360-degree image into the plurality of regions based on a predetermined number.

4. The method of claim 1, wherein the determining of the representative rotation information comprises
   determining the representative rotation information by calculating an average value or a median value of the rotation information of the plurality of regions.

5. The method of claim 1, wherein the determining of the representative rotation information comprises:
   selecting the rotation information of at least one region based on distribution of the rotation information of each of the plurality of regions; and
   determining the representative rotation information from the selected rotation information of the at least one region.

6. The method of claim 1, wherein the determining of the representative rotation information comprises
   determining the representative rotation information by combining the rotation information of each of the plurality of regions based on a predetermined weight.

7. An apparatus for processing an image, the apparatus comprising:
   an input portion configured to obtain a 360-degree image; and
   a processor configured to obtain rotation information with respect to each of a plurality of regions included in the 360-degree image, identify at least one object included in the 360-degree image, select one or more regions of the plurality of regions based on at least one of a characteristic and a distribution of the identified at least one object, determine representative rotation information indicating movement of a capturing device, the movement occurring when capturing the 360-degree image, based on rotation information of the selected one or more regions, and correct distortion of the 360-degree image based on the determined representative rotation information.

8. The apparatus of claim 7, wherein the processor is further configured to map the 360-degree image to each surface of a predetermined polygon, and
   obtain the plurality of regions from an image mapped to each surface of the polygon.

9. The apparatus of claim 7, wherein the processor is further configured to divide the 360-degree image into the plurality of regions based on a predetermined number.

10. The apparatus of claim 7, wherein the processor is further configured to determine the representative rotation information by calculating an average value or a median value of the rotation information of the plurality of regions.

11. The apparatus of claim 7, wherein the processor is further configured to select the rotation information of at least one region based on distribution of the rotation information of each of the plurality of regions, and determine the representative rotation information from the selected rotation information of the at least one region.

12. The apparatus of claim 7, wherein the processor is further configured to determine the representative rotation information by combining the rotation information of each of the plurality of regions based on a predetermined weight.

13. A non-transitory computer-readable recording medium having recorded thereon a program for executing the method of claim 1 on a computer.

* * * * *